United States Patent
Buthker et al.

(10) Patent No.: US 9,608,514 B2
(45) Date of Patent: Mar. 28, 2017

(54) DIODE CIRCUIT AND POWER FACTOR CORRECTION BOOST CONVERTER USING THE SAME

(71) Applicant: NXP B.V., Eindhoven (NL)

(72) Inventors: Henricus Cornelis Johannes Buthker, Eindhoven (NL); Matthias Rose, Helmond (NL); Philip Rutter, Stockport (GB); Jan Sonsky, Louvain (BE)

(73) Assignee: NXP B.V., Eindhoven (NL)

( * ) Notice: Subject to any disclaimer, the term of this patent is extended or adjusted under 35 U.S.C. 154(b) by 18 days.

(21) Appl. No.: 14/613,235

(22) Filed: Feb. 3, 2015

(65) Prior Publication Data
US 2015/0229205 A1    Aug. 13, 2015

(30) Foreign Application Priority Data
Feb. 13, 2014  (EP) ..................................... 14154973

(51) Int. Cl.
*H02M 7/06* (2006.01)
*H02H 9/08* (2006.01)
(Continued)

(52) U.S. Cl.
CPC ......... *H02M 1/4225* (2013.01); *H02M 3/155* (2013.01); *H02M 7/06* (2013.01);
(Continued)

(58) Field of Classification Search
CPC .... H02M 1/42; H02M 1/4225; H02M 1/4208; H02M 1/4241; H02M 1/4266; H02M 1/32; H02M 7/06; H02M 7/062; H02M 7/08; H02M 7/217; H02M 7/2176; H02M 3/02; H02M 3/04; H02M 3/10;
(Continued)

(56) References Cited

U.S. PATENT DOCUMENTS 6,714,397 B2 *  3/2004  Mauder .............. H01L 27/0255
                                                        361/93.9
7,274,116 B2   9/2007  Inoue et al.
(Continued)

FOREIGN PATENT DOCUMENTS

JP    2013-59257 A     3/2013
WO    2012/011357 A1   1/2012

OTHER PUBLICATIONS

Bjoerk, F. et al. "2nd Generation 600V SiC Schottky Diodes Use Merged pn/Schottky Structure for Surge Overload Protection", Proc. of the Applied Power Electronics Conf. and Exposition, pp. 170-173 (Mar. 2006).
(Continued)

*Primary Examiner* — Timothy J Dole
*Assistant Examiner* — Carlos Rivera-Perez

(57) ABSTRACT

Embodiments relate to a diode circuit which uses a Schottky diode. A parallel bypass branch has a switch and bypass diode in series. The operation of the switch is dependent on the voltage across the Schottky diode so that the bypass function is only effective when a desired voltage is reached. The diode circuit can be used as a replacement for a single diode, and provides bypass current protection preferably without requiring any external control input.

16 Claims, 6 Drawing Sheets

(51) Int. Cl.
  *H02M 1/42* (2007.01)
  *H02M 3/155* (2006.01)
  *H02M 1/00* (2006.01)
(52) U.S. Cl.
  CPC .... *H02M 2001/0048* (2013.01); *Y02B 70/126* (2013.01); *Y02B 70/1491* (2013.01)
(58) Field of Classification Search
  CPC ...... H02M 3/145; H02M 3/155; H02M 3/156; H02M 2001/0048; H02M 2001/0051; H02M 2001/0054; Y02B 70/12; Y02B 70/123; Y02B 70/126; Y02B 70/14; Y02B 70/1491
  USPC .......... 363/21.02, 44–48, 50, 52–54, 84, 89, 363/123–130; 323/205–211, 222–226, 323/265, 271–276, 282–285, 311, 312, 323/351, 908; 361/18, 91.5, 93.1, 93.9, 361/100, 101, 98; 257/76–78; 327/374–377
  See application file for complete search history.

(56) References Cited

U.S. PATENT DOCUMENTS

| | | |
|---|---|---|
| 2008/0042143 A1 | 2/2008 | Yedinak et al. |
| 2008/0253154 A1 | 10/2008 | Schiene et al. |
| 2009/0213513 A1 | 8/2009 | Baudesson |
| 2012/0105027 A1* | 5/2012 | Dunipace ................ G05F 3/18 323/265 |
| 2012/0217811 A1* | 8/2012 | Mari n ................ H02M 3/158 307/71 |
| 2013/0249520 A1 | 9/2013 | Oikarinen et al. |

OTHER PUBLICATIONS

Heinze, B. et al. "Surge Current Ruggedness of Silicon Carbide Schottky- and Merged-PiN-Schottky Diodes", Proc. of the 20th Intl. Symp on Power Semiconductor Devices and IC's, pp. 245-248 (May 2008).
Extended European Search Report for EP Patent Appln. No. 14154973.3 (Jun. 27, 2014).

* cited by examiner

DIODE CIRCUIT AND POWER FACTOR CORRECTION BOOST CONVERTER USING THE SAME

CROSS-REFERENCE TO RELATED APPLICATIONS

This application claims the priority under 35 U.S.C. §119 of European patent application no. 14154973.3, filed on Feb. 13, 2014, the contents of which are incorporated by reference herein.

This invention relates to a diode circuit, in particular making use of a Schottky diode, and also relates to a power factor correction circuit using the diode circuit.

One common use of a diode is as a rectifier, for example as used in Power Factor Correction (PFC) circuits. Such diodes must be able to handle high peak currents in inrush and brownout conditions. A PFC boost converter using a rectifier diode is shown in FIG. 1.

The circuit comprises an input voltage source in parallel with an input filter capacitor C1. The input voltage source forms a series circuit with an inductor L1 and a transistor switch S1. The switch S1 is also in a series circuit of diode D1 and output load $R_L$. An output filter capacitor C2 is also shown in parallel with the output load.

When the switch S1 is closed, a current is developed in the inductor which increases according to the time constant of the circuit, this is termed the storage phase. The switch is then opened after a small period of time and this causes the voltage across the switch to increase as the inductor's collapsing magnetic field attempts to maintain the current. Since the switch effectively becomes an open circuit, the voltage continues to rise until current is conducted through the output diode. Current is driven through the diode until the energy that is stored in the inductor is expended, this is termed the delivery phase. The inductor can effectively boost the supply voltage by a factor of 10-15 so that it is for example possible to charge high voltage capacitors from a low voltage battery source. Alternatively, the circuit can be supplied by a rectified AC signal. The operating frequency of this type of device can be typically be anywhere between 50-250 kHz so the diode and switch must be capable of fast, efficient switching.

The current waveform in the inductor will depend on the nature of the load to which it is connected. A capacitor load behaves very much like a constant voltage on the timescale of a storage/delivery cycle so the current ramps down more or less linearly during each delivery phase. As the capacitor voltage increases the delivery phase current ramps down faster due to the larger inductor induced voltage.

If the output capacitor C2 is not charged, applying a voltage to the input will result in a large current charging the output capacitor C2. The current is limited essentially by the resistance of the inductor L1. The inductor and capacitor can form a resonant circuit. Due to the resonant circuit, the output voltage under these circumstances can become much higher than the applied input voltage. To avoid this, an extra bypass diode D bypass is often added between the input and output as shown in FIG. 2.

The peak current in diode D1 can be about 5 to 8 times the maximum current under normal operation. This inrush current is called $I_{fsm}$ and is a non-repetitive current.

Another situation where large currents can occur for mains applications is when the mains voltage dips for one or more cycles (this is termed "brownout") or in the case of overload.

The output voltage will then decrease because more power is drawn than can be supplied by the mains or the converter. When the overload situation disappears, the controller will try to regulate the output voltage to the normal steady-state value. In doing so, it may create large inductor currents, because the controller is slow and can apply a large duty-cycle for a long time.

With silicon PN junction diodes, enabling a sufficient maximum forward surge current (the inrush current $I_{fsm}$) is not a large problem, because silicon PN junction diodes are bipolar devices with majority and minority charge carriers contributing to conduction. Therefore the forward voltage of the diode is relatively low, even in case of the high $I_{fsm}$ currents. Therefore, the instantaneous power dissipation is limited and self-heating under inrush and brownout conditions is well under control.

Schottky diodes exhibit a low forward voltage drop and fast switching action. They are of particular interest for circuits where the diode is operated in rapid sequence in the reverse direction and the forward direction. Schottky diodes are then preferred to diodes with a PN junction (and PIN diodes) because they have no flooding charge in the semiconductor body.

Wide bandgap ("WBG") semiconductors are emerging as materials capable of driving continued device performance enhancements for many years to come. These materials are typically defined as exhibiting an electronic bandgap greater than 2 eV. Silicon Carbide (SiC) has been studied for decades, but recent developments have firmly established SiC commercial products in optical, RF, and power components. With extremely high thermal and chemical stability, and electrical performance, WBG devices are used for high frequency, high temperature, and high power applications. Examples of WBG semiconductors are gallium nitride (GaN, EG=3.4 eV), aluminum nitride (AlN, EG=6.2 eV), and silicon carbide (SiC, EG between 2.2 to 3.25 eV depending on type).

Wide bandgap devices afford significant performance advantages compared to silicon semiconductor devices, for example including higher reverse voltage. Silicon carbide Schottky diodes are for example finding widespread use because of their fast switching speed, low stored charge and low forward conduction loss.

Schottky diodes are unipolar devices with only majority charge carriers contributing to the current flow. High peak currents in these devices become a problem, since current saturation can occur. At high currents, the device may show a steep increase in voltage, causing a dramatic increase in dissipation and subsequently failure of the device.

There is therefore a need to reduce the excessive forward voltage at high currents for Schottky diodes.

One possible solution which has been proposed for SiC technology Schottky diodes is to add PN-junction areas which become active and inject minority carriers into the drift region if the forward voltage increases. This approach is disclosed in Heinze, Birk et al: "Surge Current Ruggedness of Silicon Carbide Schottky- and Merged-PiN-Schottky Diodes", IEEE ISPSD 2008.

FIG. 3 shows a plot of forward voltage $V_f$ versus forward current $I_f$ for commercial SiC diodes with such a built-in PN junction. The plots are for three different commercially available devices. One set of plots (solid lines) is at room temperature, and another set of plots (dashed lines) is at an elevated operating temperature of 175 degrees Celsius.

Clearly, the current increases dramatically after the forward voltage $V_f$ has reached a threshold. This PN-junction knee voltage depends on the temperature. This behavior limits the increase in $V_f$ at high currents in the case of SiC diode technology.

Another possible approach to limiting the current is to mount a number of silicon (PN junction) diodes in series, in parallel with the GaN or SiC diode.

FIG. 4 shows this approach, in which D1 is the Schottky (e.g. GaN or SiC) diode and the other chain of diodes are silicon PN junction diodes.

The silicon diodes will start to conduct when the voltage is high enough. There are various problems with this approach. It is an expensive solution, requiring many diodes and a lot of space. The differential resistance increases with the number of silicon diodes in series. This means the current flowing through the bypass path will not increase very rapidly and instead increase as a soft curve.

FIG. 5 shows the plot of forward voltage Vf versus forward current If for the circuit of FIG. 4 and shows a near linear increase in voltage with current.

According to the invention there is provided an apparatus and method as defined in the claims.

Embodiments provide a diode circuit comprising:
a Schottky diode;
a circuit branch in parallel with the Schottky diode, the branch comprising a switch and bypass diode in series
wherein the operation of the switch is dependent on the voltage across the Schottky diode.

The switch may be used to delay the forward conduction of the bypass diode, so that it only conducts when a suitable forward voltage has been reached across the Schottky diode. This for example may enable the bypass diode to be implemented as a silicon diode which has a lower turn on voltage than the Schottky diode.

The switch may be implemented simply as a transistor with a control terminal, and input and output terminals. A first resistor may be connected between the input terminal and control terminal, and a second resistor may be connected between the output terminal and control terminals. These resistors provide suitable bias of the transistor.

The transistor may comprise a field effect transistor, the control terminal comprising the gate and the input and output terminals comprising the source and drain, or else it may comprise a bipolar transistor, the control terminal comprising the base and the input and output terminals comprising the collector and emitter.

The Schottky diode and the bypass diode may be connected at their anodes. This is suitable for use with an n-type transistor (NMOS or NPN). Alternatively, the Schottky diode and the bypass diode may be connected at their cathodes. This is suitable for use with a p-type transistor (PMOS or PNP).

The Schottky diode may comprise a wide bandgap device, in particular with a bandgap greater than 2 eV.

The wide bandgap diode preferably comprises a GaN diode.

The circuit branch may be implemented with only a single diode.

Another embodiment provides a power factor correction boost converter, comprising:
an inductor with an input for connection to a DC input;
a diode circuit connected between an output of the inductor and the converter circuit output;
a switch connected between the output of the inductor and ground; and
a power factor controller for controlling the switch operation in dependence on the voltages at the DC input and circuit output.

A rectifier may be connected to the boost converter input for generating the DC input, and the boost converter input is then an AC voltage.

Examples of the embodiments will now be described in detail with reference to the accompanying drawings, in which:

FIG. 1 shows a first example of a known boost converter;
FIG. 2 shows a second example of a known boost converter with extra bypass diode;
FIG. 3 shows the current-voltage characteristics for a wide bandgap Schottky diode with integrated PN junction areas;
FIG. 4 shows a known diode circuit;
FIG. 5 shows the current-voltage characteristics for the circuit of FIG. 4;
FIG. 6 shows in schematic form a diode circuit;
FIG. 7 shows a first example of a diode circuit operating according to the principle of the circuit of FIG. 6;
FIG. 8 shows a second example of a diode circuit operating according to the principle of the circuit of FIG. 6;
FIG. 9 shows a third example of a diode circuit operating according to the principle of the circuit of FIG. 6;
FIG. 10 shows a fourth example of a diode circuit operating according to the principle of the circuit of FIG. 6;
FIG. 11 shows the current-voltage characteristics for the circuit of FIG. 7; and
FIG. 12 shows a power factor controlled boost circuit within which the diode circuits of FIGS. 6 to 10 can be used.

Embodiments relate to a diode circuit which uses a Schottky diode. A parallel bypass branch has a switch and bypass diode in series. The operation of the switch is dependent on the voltage across the Schottky diode so that the bypass function is only effective when a desired voltage is reached. The diode circuit can be used as a replacement for a single diode, and in preferred examples provides bypass current protection without requiring any external control input.

The Schottky diode can be fabricated using one of several different technologies, and future technologies may also benefit from the diode circuit arrangement. Of particular interest currently are GaN Schottky diodes. These devices do not have a parallel PN diode and implementing such a diode on the same chip would be very expensive.

The parallel switch with series diode is then used as a bypass path which takes over at high currents. Placing a single PN diode in parallel would not suffice, as the normal forward voltage of a GaN diode is higher than that of a PN diode. In this case, the PN diode would always be active, effectively disabling the GaN diode.

By providing a voltage-dependent switch in series with the bypass diode, the activation voltage of the bypass diode may be adjusted. It is also possible to connect multiple bypass diodes in series, but this is more expensive in die area and the threshold voltage cannot be controlled accurately.

FIG. 6 shows the diode circuit in schematic form. The circuit comprises a Schottky diode D1 and a circuit branch in parallel with the Schottky diode D1. The branch comprises a switch S2 and bypass diode D2 in series. The operation of the switch is dependent on the voltage across the Schottky diode D1 as shown by the arrow. The bypass diode is a conventional semiconductor PN diode, with a bandgap less than 2 eV, such as a silicon diode.

There are several ways to implement the diode circuit. Examples are given in FIGS. 7 to 10.

The principle is to enable the switch S2 whenever the Schottky diode voltage is higher than a certain level. The threshold voltage of an NMOS transistor is about 1.5 V for a logic level FET and 4.5 V for a normal FET.

By using gate resistors (gate to source and gate to drain) this threshold can be increased to any desired value. The switch S2 can be a low voltage switch, capable of very high currents. The large reverse voltage (up to 600 V) is blocked by the bypass diode D2. This diode is only used during transient conditions of high current that will not last very long, so it can be a low cost silicon diode with high current rating.

FIG. 7 shows a first example with a field effect transistor, in particular an NMOS transistor, as the switch S2. The Schottky diode D1 and the bypass diode D2 are connected at their anodes, and the switch S2 is connected between the bypass diode cathode and the Schottky diode cathode. The two diodes have the same orientation in their respective branches.

The overall circuit is a two terminal circuit, and the terminals are shown as 70, 72. This two terminal circuit can be used as a replacement for a diode. It requires no external control input, and the voltage dependency of the switch is effected by passive component values rather than active control.

The gate source voltage will be a fixed threshold voltage at turn on of the transistor, and this will give rise to a given current through the gate-source resistor. The size of the gate-drain resistor (through which essentially the same current will flow) then determines the gate-drain voltage. In this way, the resistor values can be selected to give rise to a desired drain-source voltage at turn on. Thus, the turn on of the switch is thus dependent on a sufficient voltage across the Schottky diode D1.

When the diode D1 conducts under normal operating conditions (no high inrush current) the voltage across the two resistors will be equal to the difference between the knee voltages of diodes D1 and D2. The difference will typically be several 100 mV. The resistors can be in the range of kOhms to ensure negligible currents such as below 1 mA flow through D2. Currents of a few tens of microamps are sufficient for circuit operation. The main current flowing can be of the order of amps.

In the other circuit examples described below, the turn on voltage can be tuned in a similar manner.

FIG. 8 shows a second example with a bipolar NPN transistor as the switch S2, and the circuit is otherwise the same (with the source and drain becoming the collector and emitter and the gate becoming the base). The Schottky diode D1 and the bypass diode are again connected at their anodes, and the switch S2 is connected between the bypass diode cathode and the Schottky diode cathode.

FIG. 9 shows a third example with a field effect transistor, in particular a PMOS transistor, as the switch S2. The Schottky diode D1 and the bypass diode are connected at their cathodes, and the switch S2 is connected between the bypass diode anode and the Schottky diode anode. The two diodes again have the same orientation in their respective branches.

While the extra circuitry is active, the higher reverse recovery energy of diode D2 will cause more power dissipation in the switch S1 each time S1 is turning on.

The resulting loss of efficiency lasts only for a short time and is acceptable as long as it will not overload the switch. The typical current rating for an 8 A diode is $I_{fsm}=40$ A.

As mentioned above, one application is for power factor correction circuits.

Figure 12:
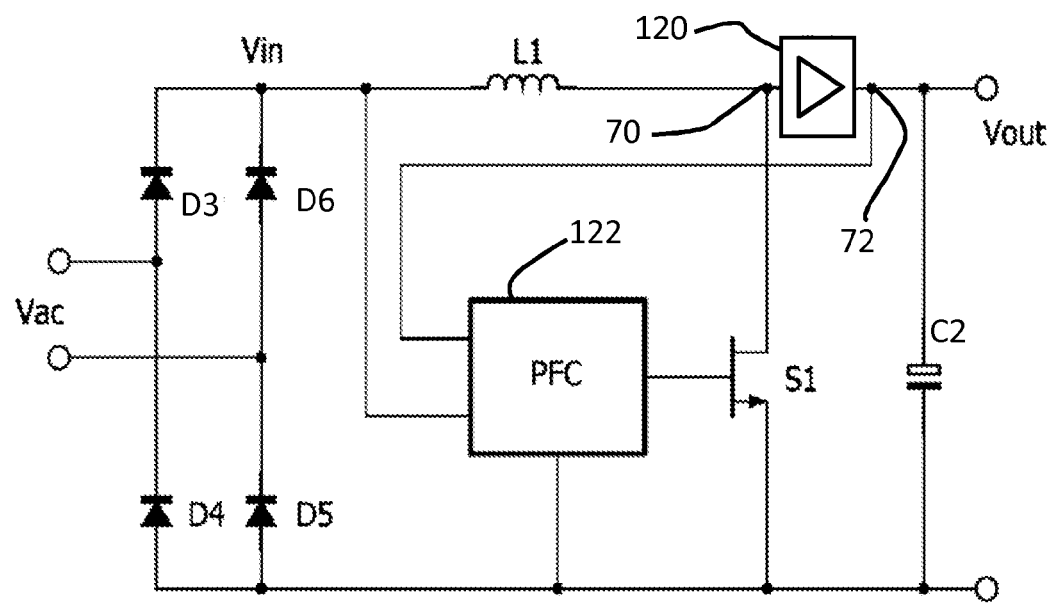

FIG. 12 shows a power factor correction circuit. An input voltage Vac is rectified by means of a diode bridge D3, D4, D5, D6. The rectified input voltage Vin is applied to the inductor L1 (which may alternatively be a winding of a transformer) which is connected between the input voltage terminal Vin and the drain of the field effect transistor S1.

Figure 1:
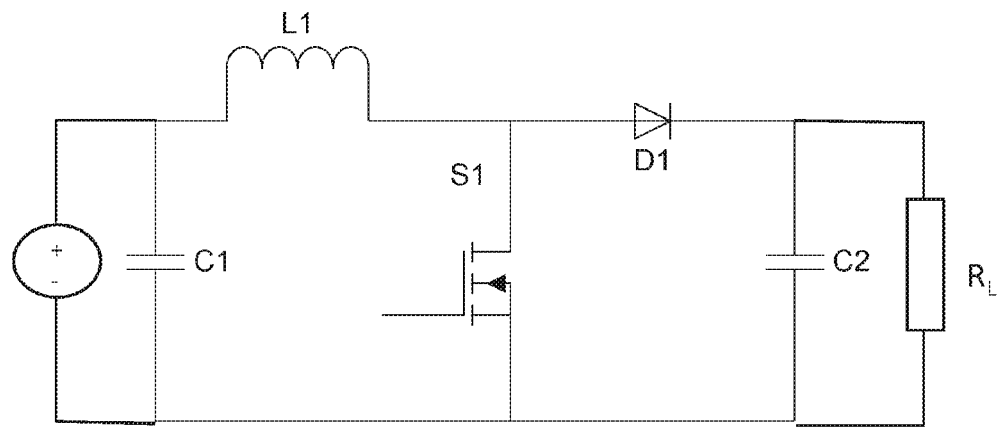
Figure 2:
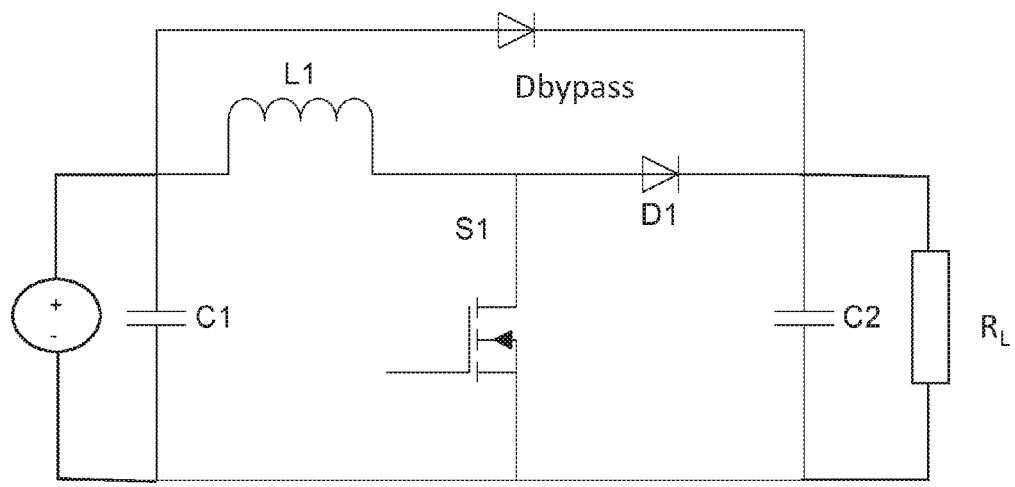
Figure 3:
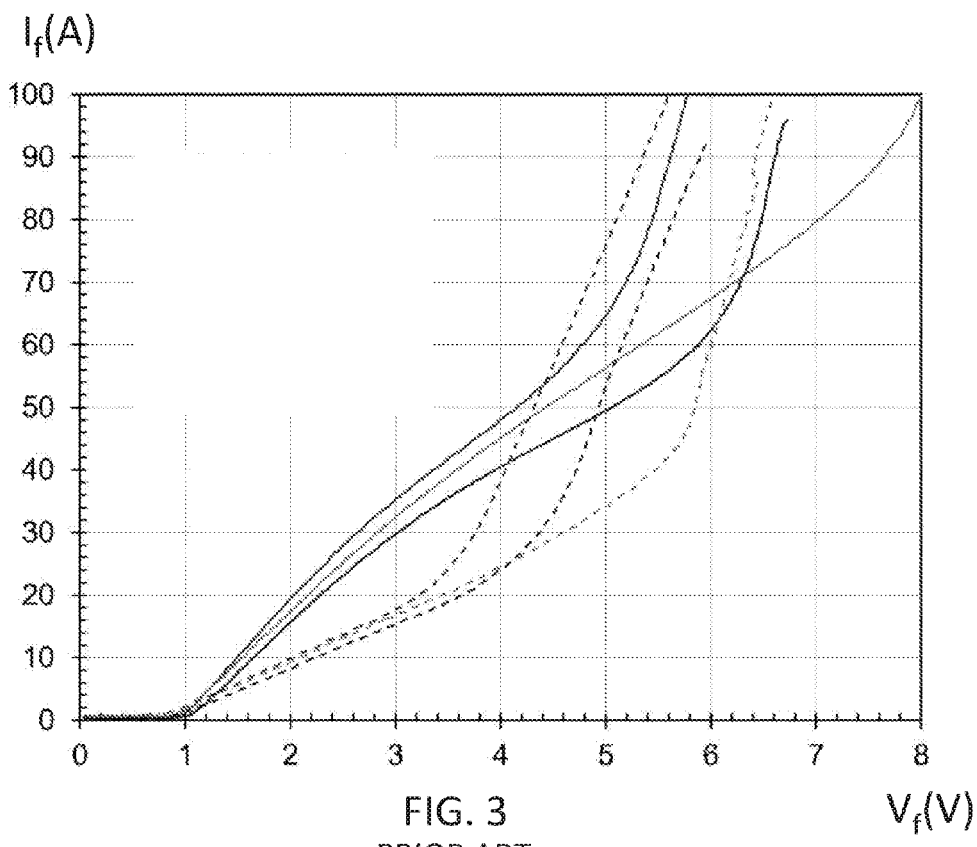
Figure 4:
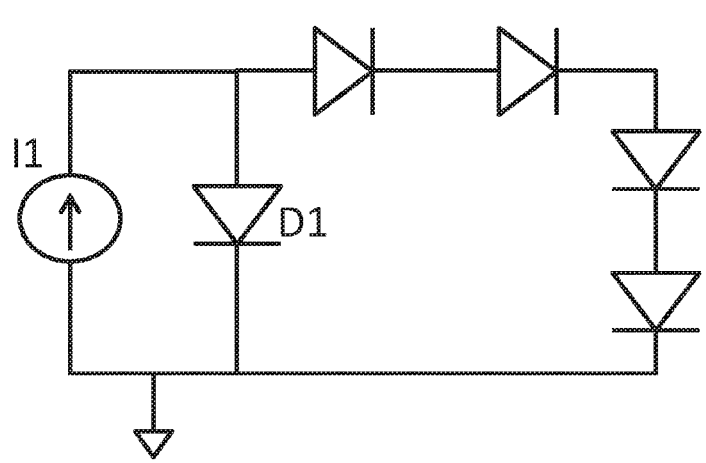
Figure 5:
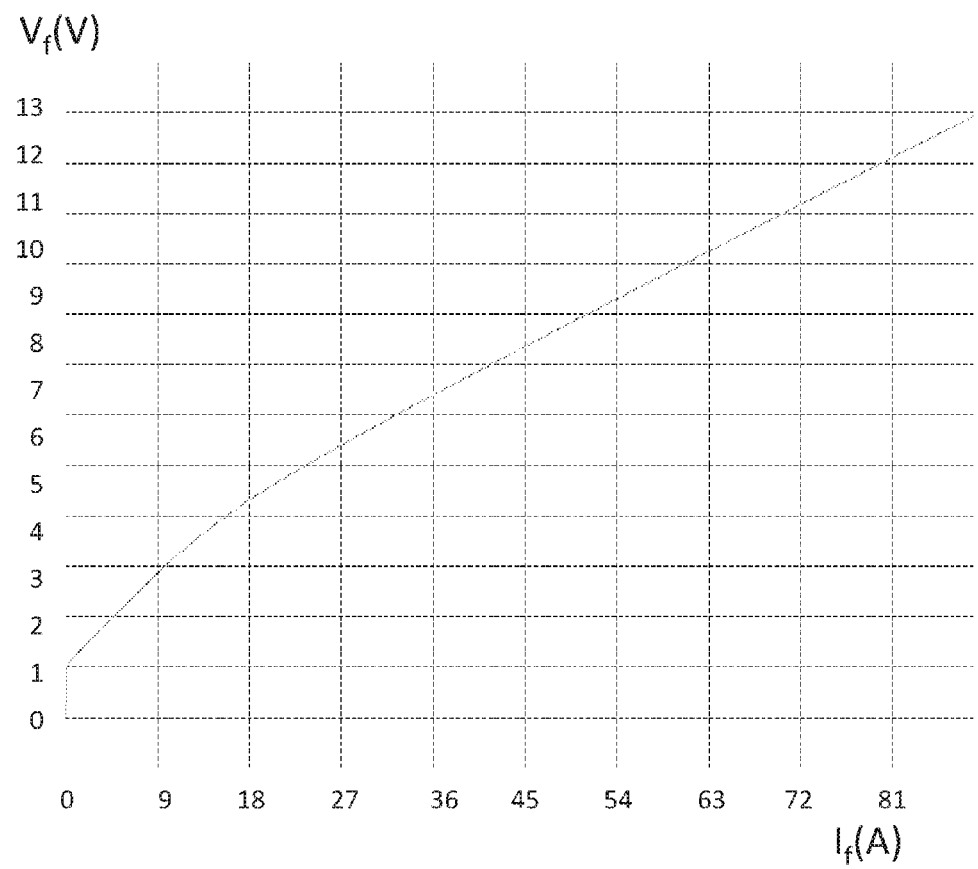
Figure 6:
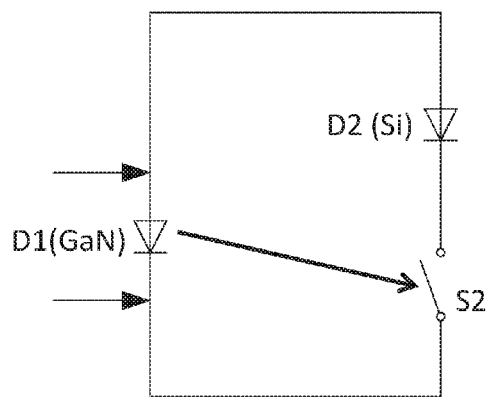
Figure 7:
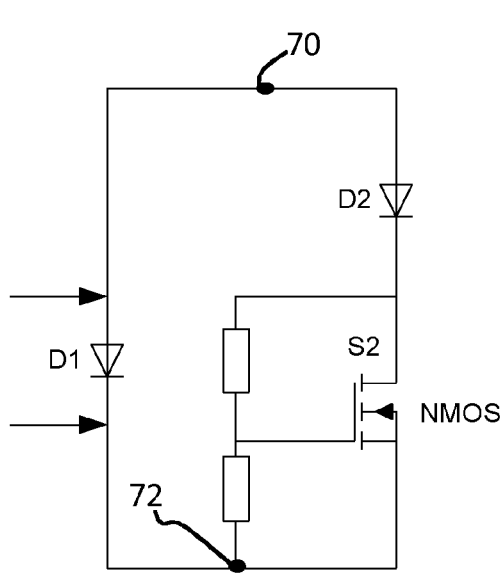
Figure 8:
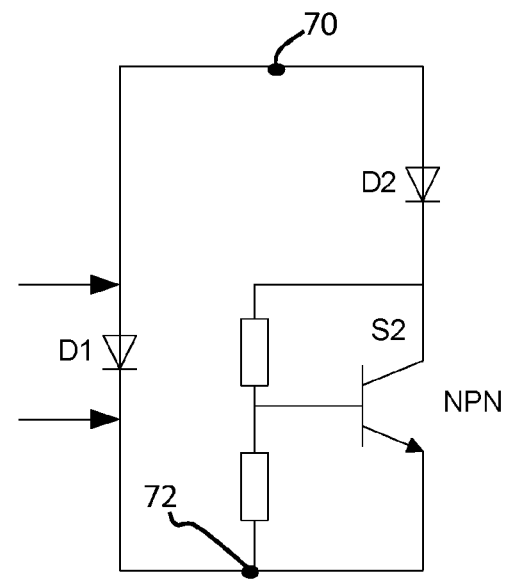
Figure 9:
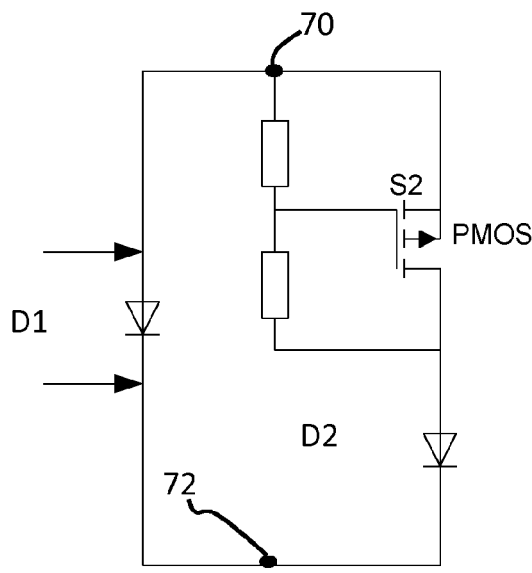
Figure 10:
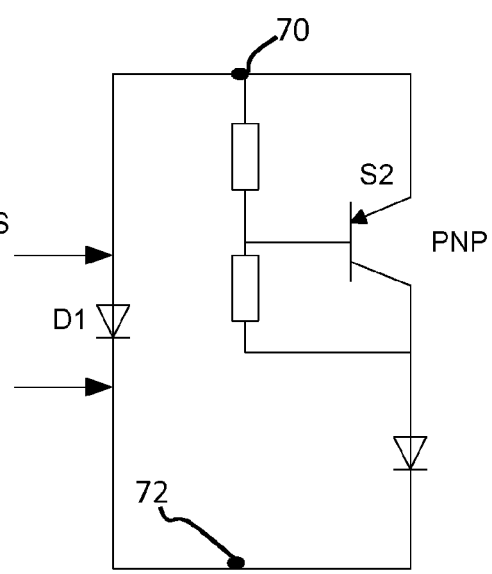
FIG. 10 shows a fourth example with a bipolar PNP transistor replacing the PMOS transistor of FIG. 9.
Figure 11:
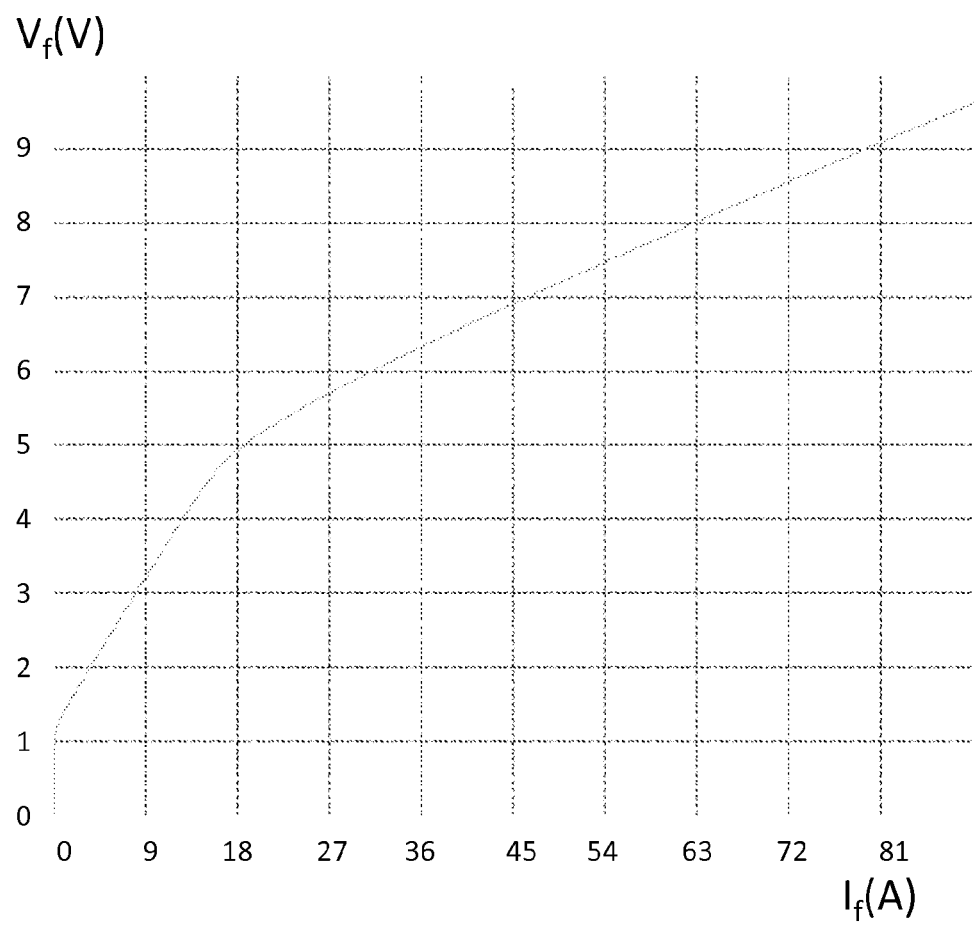
FIG. 11 shows the relationship between forward voltage Vf and forward current If for the circuit of FIG. 7. It shows that around 5V the transistor S2 turns on and starts conducting current.

The diode circuit 120 is connected between the drain of the field effect transistor S1 and an output voltage terminal Vout. The output capacitor C2 is connected between the output voltage terminals. The configuration is thus as shown in FIG. 1. However, the circuit additionally comprises a power factor controller 122. An output voltage sense input of the power factor controller 122 is connected to the output voltage terminal Vout and an input voltage sense input of the power factor controller is connected to the input voltage terminal.

The power factor controller 122 controls the opening and closing of switch S1 in each conversion cycle. The conversion cycle may include the switch-on time Ton, the time duration when the control switch is closed, and switch-off time Toff, the time duration when the switch is open. During Ton, the current through the inductor increases, and the diode D1 is not conducting. During Toff, for the continuous conducting mode (CCM) of operation, the current through the inductor L1 is decreasing, and the diode D1 is conducting. For the boundary condition mode (BCM) operation, when the control switch S1 is off, the current through inductor L1 will initially decrease with the diode D1 initially conducting. Then, when the current through the inductor reaches zero, the diode D1 will stop conducting, and both the transistor drain voltage and the current through the inductor will start oscillating due to the combination of an inductor and a ringing capacitor. It will be understood that the ringing capacitor may be a parasitic capacitance in the control switch S1 or it may be a discrete capacitor incorporated into the boost converter. The parasitic capacitance of a control switch S1 implemented as a field-effect-transistor (FET) is for example the gate-to-drain capacitance of the FET.

The power factor controller 122 typically includes a voltage divider, an error amplifier, a valley detection circuit and a timer control circuit. During regular operation, the output voltage Vout from the boost converter may first be divided by a power divider by a factor K, where K>1, to make Vout easier to be processed by an error amplifier. The resulting attenuated voltage signal Vout/K is then compared with a reference voltage, and their difference is processed by the error amplifier in order adjust the switch-on time Ton.

In the boundary conduction mode operation, the drain voltage can be sensed by the valley-detection circuit and when a minimum valley is reached, the switch S1 can be triggered to turn on again.

The diode circuit 120 in the circuit of FIG. 12 comprises the diode circuit described above, such as shown in FIGS. 7 to 10. The diode circuit has terminals 70,72 which function as anode and cathode of the diode circuit as shown. The power factor controller 120 does not need any modification as a result of using the diode circuit instead of a basic diode.

Thus, it can be seen that the diode circuit can be used in a Boost converter used as a Power Factor Correcting Converter (PFC). The boost converter can operate in Continuous Conduction Mode (CCM), Boundary Conduction Mode (BCM), also known as Critical Conduction Mode, and Discontinuous Conduction Mode (DCM). The stress on the diode D1 is the highest in CCM, when a temporary drop of input voltage or short overload on the output can cause the controller to increase the inductor current dramatically. A well-designed controller has a current limit, either peak or average current, but low cost designs may not have this current limit. The inductor current may then rise to up to 5 times the normal operating level.

The diode circuit provides bypass current limiting protection.

It has been explained above that the Schottky diode D1 may be a wide bandgap diode, namely having an electronic bandgap greater than 2 eV. The unipolar behaviour of the Schottky diode causes the problem of a dramatic increase in forward voltage, and this is not limited to wide bandgap devices. The Schottky diode may for example be a silicon device instead of a GaN (or SiC) device as in the example above. The circuit can be applied generally to unipolar diodes (e.g. with majority carriers only), and wide bandgap diodes provide one set of examples.

The examples above make use of a transistor for performing a switch function and diode in the bypass path.

The transistor and its associated resistors may be implemented as a thyristor or silicon controlled rectifier. In one example, a small IC for implementing the switch control can be used to replace the resistors. Instead of the bipolar or MOS transistors, an insulated gate bipolar transistor (IGBT) can be used. Indeed, many different switch technologies can be used providing they have the ability to handle the large currents.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A diode circuit comprising:
    a gallium nitride Schottky diode; and
    a circuit branch in parallel with the Schottky diode, the branch comprising a transistor and a bypass PN junction diode in series,
    wherein the transistor having a control terminal, an input terminal, and an output terminal, a first resistor is connected between the input terminal and the control terminal, and a second resistor is connected between the output terminal and the control terminal, and wherein the transistor is conductive to provide a current to the bypass PN junction diode when a voltage across the gallium nitride Schottky diode becomes a desired voltage as determined by resistance values of the first and second resistors.

2. The circuit as claimed in claim 1, wherein the transistor comprises a field effect transistor, the control terminal comprising the gate and the input and output terminals comprising the source and drain.

3. The circuit as claimed in claim 1, wherein the transistor comprises a bipolar transistor, the control terminal comprising the base and the input and output terminals comprising the collector and emitter.

4. The circuit as claimed in claim 1, wherein the Schottky diode and the bypass PN junction diode are connected at their anodes.

5. The circuit as claimed in claim 1, wherein the Schottky diode and the bypass PN junction diode are connected at their cathodes.

6. The circuit as claimed in claim 1, wherein the Schottky diode comprises a material having an electronic bandgap greater than 2 eV.

7. The circuit as claimed in claim 1, wherein the bypass diode comprises a material having an electronic bandgap less than 2 eV.

8. The circuit as claimed in claim 1, wherein the circuit branch comprises only a single diode.

9. A power factor correction boost converter, comprising:
    an inductor with an input for connection to a DC input;
    the diode circuit as claimed in any preceding claim, the diode circuit connected between an output of the inductor and a converter circuit output;
    a switch connected between the output of the inductor and ground; and
    a power factor controller for controlling the switch operation in dependence on the voltages at the DC input and the converter circuit output.

10. The power factor correction boost converter as claimed in claim 9, further comprising a rectifier connected to a boost converter input for generating the DC input.

11. A diode circuit comprising:
    a Schottky diode having a first terminal and a second terminal;
    a PN junction diode having a first terminal connected to the first terminal of the Schottky diode, and a second terminal;
    a transistor having a first terminal connected to the second terminal of the PN junction diode, a second terminal connected to the second terminal of the Schottky diode, and a control terminal;
    a first resistor having a first terminal connected to the first terminal of the transistor, and a second terminal connected to the control terminal of the transistor; and
    a second resistor having a first terminal connected to the control terminal of the transistor, and a second terminal connected to the second terminal of the transistor,
    wherein the first and second resistors delay conduction of the transistor until a predetermined voltage across the Schottky diode has been reached.

12. The diode circuit of claim 11, wherein the first terminals of the Schottky diode and the PN junction diode are anodes.

13. The diode circuit of claim 11, wherein the Schottky diode is a gallium nitride Schottky diode.

14. The diode circuit of claim 11, wherein the diode circuit is implemented as part of a power factor correction boost converter, the power factor correction boost converter comprising:
    an inductor with an input for connection to a DC input;
    a switch connected between the output of the inductor and ground; and
    a power factor controller for controlling the switch operation in dependence on the voltages at the DC input and the converter circuit output,
    wherein the first terminal of the Schottky diode is connected to an output of the inductor and the second terminal of the Schottky diode is connected to a converter circuit output.

15. The diode circuit of claim 11, wherein the transistor is a metal-oxide semiconductor transistor.

16. The diode circuit of claim 11, wherein the transistor is a bipolar transistor.

* * * * *